United States Patent
Kobayashi et al.

(10) Patent No.: US 8,171,711 B2
(45) Date of Patent: May 8, 2012

(54) HYBRID CARBON FIBER SPUN YARN AND HYBRID CARBON FIBER SPUN YARN FABRIC USING THE SAME

(75) Inventors: Tatsuo Kobayashi, Iwaki (JP); Naohiro Sonobe, Iwaki (JP); Shigeki Iwamoto, Chuo-ku (JP)

(73) Assignee: Kureha Corporation, Tokyo (JP)

( * ) Notice: Subject to any disclaimer, the term of this patent is extended or adjusted under 35 U.S.C. 154(b) by 1293 days.

(21) Appl. No.: 11/884,872

(22) PCT Filed: Feb. 17, 2006

(86) PCT No.: PCT/JP2006/302822
§ 371 (c)(1),
(2), (4) Date: Aug. 22, 2007

(87) PCT Pub. No.: WO2006/090643
PCT Pub. Date: Aug. 31, 2006

(65) Prior Publication Data
US 2008/0152906 A1 Jun. 26, 2008

(30) Foreign Application Priority Data
Feb. 22, 2005 (JP) .................................. 2005-046155

(51) Int. Cl.
*D02G 3/02* (2006.01)
(52) U.S. Cl. ................. 57/210; 57/224; 57/243; 57/244
(58) Field of Classification Search .................... 57/210, 57/224, 243, 244
See application file for complete search history.

(56) References Cited

U.S. PATENT DOCUMENTS

| 4,698,956 | A | * | 10/1987 | Clarke et al. .................... 57/2 |
| 5,119,512 | A | * | 6/1992 | Dunbar et al. .................... 2/167 |
| 5,127,783 | A | * | 7/1992 | Moghe et al. .................. 411/411 |
| 5,277,850 | A | * | 1/1994 | Kitajima et al. ............... 264/29.2 |
| 5,496,625 | A | * | 3/1996 | Lilani ............................ 442/190 |
| 6,316,051 | B2 | * | 11/2001 | Okada ........................... 427/214 |
| 2004/0025486 | A1 | * | 2/2004 | Takiue ............................ 57/224 |

FOREIGN PATENT DOCUMENTS

| CN | 02104397 | 10/2002 |
| JP | 53-81735 | 12/1976 |
| JP | 59-228068 | 6/1983 |
| JP | 01-246434 | 3/1988 |
| JP | 2002-352807 | 5/2001 |
| JP | 2003-288906 | 3/2002 |

OTHER PUBLICATIONS

International Search Report for PCT/JP2006/302822 dated Jun. 6, 2006.

* cited by examiner

*Primary Examiner* — Shaun R Hurley
(74) *Attorney, Agent, or Firm* — Oliff & Berridge, PLC (57) ABSTRACT

A hybrid carbon fiber spun yarn having a core region with carbon fibers as a main component, and a surrounding region with carbon fibers as a main component and covers an outer peripheral surface of the core region. 20% by mass or more of fibers forming the core region are long carbon fibers having a fiber length of 500 mm or longer. 80% by mass or more of fibers forming the surrounding region are short carbon fibers having a fiber length of less than 500 mm. A mass ratio between the long carbon fibers and the short carbon fibers (long carbon fibers:short carbon fibers) is in a range of 20:80 to 80:20.

19 Claims, 4 Drawing Sheets

[Table 1]

| | Core region (long carbon fibers) | | | | | Surrounding region (short carbon fibers) | | | | | Hybrid carbon fiber spun yarn (*2) | | | Hybrid carbon fiber spun yarn fabric (*3) | | |
|---|---|---|---|---|---|---|---|---|---|---|---|---|---|---|---|---|
| | Density | Length (*1) | Tensile strength of carbon fiber | Content | Density | Proportion of fibers having a length of 150 mm or longer and less than 500 mm | Proportion of fibers having a length of less than 150 mm | Tensile strength of carbon fiber | Content | Fineness | Tensile strength of spun yarn | Adhesion properties to matrix | Thickness | FAW | Weaving |
| | (g/cm³) | | (MPa) | (% by mass) | (g/cm³) | (% by mass) | (% by mass) | (MPa) | (% by mass) | (tex) | (N/tex) | | (mm) | (g/m²) | |
| Ex. 1 | 1.76 | Continuous fiber | 3720 | 50 | 1.65 | 12.0 | 88.0 | 820 | 50 | 66 | 0.95 | A | 0.12 | 95 | Plain weave |
| Ex. 2 | 1.76 | Continuous fiber | 3720 | 30 | 1.65 | 12.0 | 88.0 | 820 | 70 | 66 | 0.57 | A | 0.12 | 95 | Plain weave |
| Ex. 3 | 1.76 | Continuous fiber | 3720 | 70 | 1.65 | 12.0 | 88.0 | 820 | 30 | 66 | 1.26 | A | 0.12 | 95 | Plain weave |
| Ex. 4 | 1.81 | Continuous fiber | 2740 | 50 | 1.65 | 12.0 | 88.0 | 820 | 50 | 66 | 0.75 | A | 0.12 | 95 | Plain weave |
| Ex. 5 | 1.76 | Continuous fiber | 3720 | 50 | 1.65 | 12.0 | 88.0 | 820 | 50 | 66 | 0.95 | A | 0.12 | 95 | Twill weave |
| Ex. 6 | 1.76 | Continuous fiber | 3720 | 45 | 1.65 | 12.0 | 88.0 | 820 | 55 | 149 | 0.86 | A | 0.20 | 150 | Plain weave |
| Ex. 7 | 1.76 | Continuous fiber | 3920 | 50 | 1.65 | 12.0 | 88.0 | 820 | 50 | 400 | 0.95 | A | 0.83 | 515 | Plain weave |
| Ex. 8 | 1.93 | Continuous fiber | 1600 | 50 | 1.65 | 12.0 | 88.0 | 820 | 50 | 66 | 0.40 | A | 0.12 | 95 | Plain weave |
| Ex. 9 | 1.76 | Continuous fiber | 3720 | 50 | 1.76 | 15.0 | 85.0 | 3920 | 50 | 66 | 1.00 | A | 0.12 | 95 | Plain weave |
| Comp. Ex. 1 | - | - | - | - | 1.65 | 12.0 | 88.0 | 820 | 100 | 66 | 0.24 | A | 0.12 | 95 | Plain weave |
| Comp. Ex. 2 | 1.76 | Continuous fiber | 3720 | 100 | - | - | - | - | - | 66 | 1.90 | C | 0.12 | 95 | Plain weave |
| Comp. Ex. 3 | 1.76 | Continuous fiber | 3720 | 10 | 1.65 | 12.0 | 88.0 | 820 | 90 | 66 | 0.30 | A | 0.12 | 95 | Plain weave |
| Comp. Ex. 4 | 1.76 | Continuous fiber | 3720 | 90 | 1.65 | 12.0 | 88.0 | 820 | 10 | 66 | 1.71 | C | 0.12 | 95 | Plain weave |

*1: Continuous fiber means a fiber having a length of 5 m or longer (form: filament).
*2: In Comparative Example 1, the isotropic pitch-based carbon fiber spun yarn was evaluated, and in Comparative Example 2, the long carbon fiber bundle of PAN-based continuous fibers was evaluated.
*3: In Comparative Example 1, the fabric formed of the isotropic pitch-based carbon fiber spun yarns was evaluated, and in Comparative Example 2, a fabric formed of the long carbon fiber bundles of PAN-based continuous fibers was evaluated.

HYBRID CARBON FIBER SPUN YARN AND HYBRID CARBON FIBER SPUN YARN FABRIC USING THE SAME

TECHNICAL FIELD

The present invention relates to a hybrid carbon fiber spun yarn useful for a gas diffuser (a collector) for solid polymer electrolyte fuel cell, or the like, and a hybrid carbon fiber spun yarn fabric using the same.

BACKGROUND OF THE INVENTION

Recently, so-called PAN-based carbon fibers using polyacrylonitrile (PAN) as a starting material, so-called rayon-based carbon fibers using rayon as a starting material, and so-called pitch-based carbon fibers using pitches as a starting material are manufactured as carbon fibers. Moreover, as pitch-based carbon fibers, anisotropic carbon fibers and isotropic carbon fibers are manufactured. Among them, pitch-based isotropic carbon fibers are widely used for usages in which the characteristics such as lightness, chemical resistance, heating resistance, sliding ability and electrical conductivity are demanded, because pitch-based isotropic carbon fibers are comparatively economic due to starting material of low price, and can be manufactured by a method suitable for mass production.

Moreover, carbon fibers are used in various forms such as a filament, a sliver (a fiber bundle), a spun yarn, a fabric, a chopped fiber, a milled fiber, a mat, and a prepreg. Further, a heat treatment temperature and a degree of carbonization for manufacturing carbon fibers can be adjusted depending on the usage. Among them, carbon fiber spun yarns and carbon fiber fabrics are used as composition materials such as a heat insulation, a sliding member, a conductive material, or the like, especially, used as the electronic industry materials such as a gas diffuser for a solid polymer electrolyte fuel cell.

Therefore, such carbon fiber spun yarns and carbon fiber fabrics are demanded that they have not only flexibility and electrical conductivity but also gas permeability, adhesion to a matrix material such as polymer materials, uniformity of fineness and thickness, high tensile strength, and the like.

The carbon fiber spun yarns and carbon fiber fabrics can have a high electrical conductivity by heat-treating them at a high temperature of 900° C. or higher, to improve their degree of carbonization.

Further, when the carbon fiber fabrics are used as a gas diffuser for a solid polymer electrolyte fuel cell, the gas permeability depends on the aperture ratio (porosity). However, when a too-rough porous body is used as the gas diffuser, contact with the catalyst layer becomes poor, so that a problem with electric power collection is occurred. Moreover, for the filament fabric in which single yarns are aligned, there is a problem that the aperture ratio (porosity) is small and the gas permeability is low. Therefore, as such carbon fiber fabrics, spun yarn fabrics are still preferable than filament fabrics in which the single yarns may be aligned and of which the density thereof becomes high easily. Moreover, it is necessary to appropriately control the thickness of the carbon fiber fabrics used as a gas diffuser in consideration of the diffusion of a reactive gas to the catalyst layer.

Therefore, carbon fiber fabrics used as a gas diffuser are preferably spun yarn fabrics having an appropriate thickness and having a heat history of 900° C. or higher. As a method for obtaining such spun yarn fabrics, a method of weaving a fabric using spun yarns of flame-resistant fibers or carbonaceous fibers, and then heat-treating the resultant fabric at a temperature of 900° C. or higher, or a method of heat-treating spun yarns at a temperature of 900° C. or higher, and then weaving a fabric using the heat-treated spun yarns, is adopted.

As such carbon fiber spun yarns, PAN-based spun yarns having flame-resistant and pitch-based spun yarns are known. However, it is difficult to weave a fabric using the PAN-based spun yarns of flame-resistant because the strength thereof decreases extremely when they are heat-treated at 900° C. Therefore, if the method of weaving a fabric using the flame-resistant fibers, and then heat-treating the resultant fabric at a temperature of 900° C. is not adopted, the objective fabric cannot be obtained. However, in that case, there has been a fault that strength of the resultant fabric lowered due to the fiber distortion by heat-treatment and the strength decrease of the spun yarn by heat-treatment. Moreover, if a carbon fiber having a long fiber length such as a PAN-based continuousness carbon fiber is used, there is a problem that the adhesion of the resultant spun yarn to a matrix material is inferior.

Therefore, Japanese Unexamined Patent Application Publication No. 2002-352807 (document 1), for instance, discloses a gas diffuser comprising a porous carbon substrate that is formed by uniting carbon fibers having a fiber length of 25 to 80 mm with air-gaps, and that contains a particulate fluororesin in an amount of 1 to 40 wt %, wherein the particulate fluororesin binds the carbon fibers together with each other as a binder. Moreover, Japanese Unexamined Patent Application Publication No. 2003-288906 (document 2) discloses a gas diffuser having a carbon layer on at least one side of a carbon fiber fabric for an electrode, wherein the carbon layer includes carbon black and a fluororesin. However, in the carbon fiber spun yarns described in document 1 and document 2, tensile strength thereof is low. For this reason, the gas diffusers fabric comprising them have a problem of an inevitable decrease of electric power collection ability due to a reason that the particulate fluororesin which is a binder or the carbon layer is used to improve tensile strength of the resultant carbon fiber fabric.

Further, in Japanese Unexamined Patent Application Publication No. Sho 53-81735, there is proposed to obtain carbon fiber spun yarns having an improved strength by spinning sliver-shaped carbon fibers having a fiber length of 25 mm or longer, more preferably in a range of 50 to 75 mm. However, in the carbon fiber spun yarns thus obtained, the tensile strength thereof is in a range of around 0.08 to 0.09 N/tex, and it is not enough yet.

On the other hand, the majority of pitch-based isotropic carbon fibers are those having a short fiber length. Moreover, spun yarns which are produced by using pitch-based isotropic carbon fibers and improving carbonization thereof are marketed. However, carbon fiber spun yarns having a sufficient tensile strength as well as a low fineness fluctuation cannot be commercially available. Therefore, fabrics woven using commercially available carbon fiber spun yarns are not enough in the point of strength and the thickness fluctuation.

DISCLOSURE OF THE INVENTION

The present invention was made in consideration of the problems of the conventional technology described above. It is an object of the present invention to provide a hybrid carbon fiber spun yarn having a high tensile strength without leading to a decrease in adhesion to a matrix material such as polymer materials, and having an excellent uniformity of fineness as well. Moreover, it is another object of the present invention to provide a carbon fiber spun yarn fabric having an excellent adhesion to a matrix material and a mechanical strength, and having an excellent uniformity of thickness as well.

As a result of extensive studies to attain the foregoing objects, the present inventors have found out a hybrid carbon fiber spun yarn capable of achieving the objects by covering a core region comprising long carbon fibers having a fiber length of 500 mm or longer as a main component, with a surrounding region comprising short carbon fibers having a fiber length of less than 500 mm as a main component, and thus have accomplished the present invention.

A hybrid carbon fiber spun yarn of the present invention comprises a core region which comprises carbon fibers as a main component, and a surrounding region which comprises carbon fibers as a main component and covers an outer peripheral surface of the core region. Twenty percent (20%) by mass or more of fibers forming the core region are long carbon fibers having a fiber length of 500 mm or longer. Eighty percent (80%) by mass or more of fibers forming the surrounding region are short carbon fibers having a fiber length of less than 500 mm. A mass ratio between the long carbon fibers and the short carbon fibers (long carbon fibers: short carbon fibers) is in a range of 20:80 to 80:20.

A hybrid carbon fiber spun yarn fabric of the present invention comprises the hybrid carbon fiber spun yarn in an amount of 30% by mass or more.

In the hybrid carbon fiber spun yarn of the present invention, it is preferable that the long carbon fibers are at least one kind of carbon fibers selected from the group consisting of pitch-based anisotropic carbon fibers, polyacrylonitrile-based carbon fibers, and rayon-based carbon fibers.

Moreover, in the hybrid carbon fiber spun yarn of the present invention, it is preferable that the short carbon fibers are pitch-based isotropic carbon fibers and/or polyacrylonitrile-based carbon fibers.

Furthermore, in the hybrid carbon fiber spun yarn of the present invention, it is preferable that the long carbon fibers are polyacrylonitrile-based carbon fibers, and the short carbon fibers are pitch-based isotropic carbon fibers.

Moreover, in the hybrid carbon fiber spun yarn of the present invention, it is preferable that a content of carbon fibers having a fiber length of 150 mm or longer and less than 500 mm in the short carbon fibers is in a range of 3 to 30% by mass.

Furthermore, in the hybrid carbon fiber spun yarn of the present invention, it is preferable that the surrounding region comprises a twisted yarn comprising the short carbon fibers as a main component, and the outer peripheral surface of the core region is covered with the twisted yarn by twisting the twisted yarn together with the core region comprising the long carbon fibers as a main component.

Moreover, in the hybrid carbon fiber spun yarn of the present invention, it is preferable:
(i) that a twist number of the hybrid carbon fiber spun yarn is in a range of 50 to 400 turns/m;
(ii) that a density of the long carbon fibers is in a range of 1.7 to 2.3 g/cm$^3$, and a density of the short carbon fibers is in a range of 1.5 to 1.8 g/cm$^3$; and/or
(iii) that a mass per 1000 m (tex) is in a range of 30 to 150 g.

The reason is not necessarily apparent why the hybrid carbon fiber spun yarn of the present invention has a high tensile strength without leading to a decrease in adhesion to a matrix material such as polymer materials, and an excellent uniformity of fineness as well. The present inventors estimate the reason as follows.

First, in the hybrid carbon fiber spun yarn of the present invention, a core region thereof comprises long carbon fibers having a high tensile strength as a main component, so that the hybrid carbon fiber spun yarn has a high tensile strength. More specifically, a spun yarn is a long bundle in which discontinuous fibers is connected with each other by twisting the discontinuous single fibers and intertwine them each other. Therefore, its tensile strength is maintained by the frictional force due to intertwining (contact) of the single fibers. Further, as the intertwining of the single fibers increases, a contact area of fibers increases to increase the frictional force of the fibers, and thereby strength of the fibers increases. Moreover, the fibers come to be pressed strongly each other by increasing of the twisting, and thereby the frictional force of the fibers increases to improve tensile strength of the spun yarn. Furthermore, a connecting point of the fibers decreases as the fiber length of the fibers becomes long, so that strength of the spun yarn thus obtained is improved. In the hybrid carbon fiber spun yarn of the present invention, a core region thereof comprises long carbon fibers having a fiber length of 500 mm or longer as a main component, and the outer peripheral surface of the core region is covered with short carbon fibers having a fiber length of less than 500 mm. The present inventors suppose that the present invention, therefore, makes it possible to attain the above described high tensile strength.

Further, in the hybrid carbon fiber spun yarn of the present invention, the outer peripheral surface of the core region is covered with short carbon fibers having a lot of surface fluffs, though the core region comprises the long carbon fibers having poor adhesion to a matrix material. The present inventors suppose that the present invention makes it possible to maintain sufficiently high adhesion to a matrix material by anchor effect of the surface fluffs of the carbon fibers forming the surrounding region.

Furthermore, in the hybrid carbon fiber spun yarn of the present invention, the core region comprises the long carbon fibers having a high tensile strength and a uniformity of fineness, and the core region is twisted together with the short carbon fibers forming the surrounding region, and thereby tensile strength of the hybrid carbon fiber spun yarn of the present invention is stronger than that of a spun yarn which is formed by the short carbon fibers alone. Moreover, it is possible to shorten a fiber length of the carbon fiber forming the surrounding region. The present inventors suppose that the present invention, therefore, makes it possible to sufficiently prevent generation of a massive part such as so-called slab and fly, in the hybrid spun yarn.

The hybrid carbon fiber spun yarn fabric of the present invention is obtained by using the above described hybrid carbon fiber spun yarn having an excellent adhesion to a matrix material and a high tensile strength, and an excellent uniformity of fineness as well, so that the hybrid carbon fiber spun yarn fabric of the present invention has an excellent adhesion to a matrix material and an excellent mechanical strength, and an excellent uniformity of thickness as well. Moreover, in the hybrid carbon fiber spun yarn fabric of the present invention, the hybrid carbon fiber spun yarns forming the fabric do not bring into close contact with each other for the presence of the surface fluffs in the surrounding region, so that a suitable aperture ratio (porosity) as for the fabric is maintained. The present inventors suppose that the present invention, therefore, makes it possible to produce the hybrid carbon fiber spun yarn fabric having an excellent permeability to gases.

According to the present invention, it is possible to provide a hybrid carbon fiber spun yarn having a high tensile strength without leading to a decrease in adhesion to a matrix material such as polymer materials, and having an excellent uniformity of fineness as well. Moreover, according to the present invention, it is possible to provide a hybrid carbon fiber spun yarn fabric having an excellent adhesion to a matrix material and an excellent mechanical strength, and having an excellent uniformity of thickness as well.

BRIEF DESCRIPTION OF THE DRAWINGS

FIG. 5 is a table showing the evaluation results.

DETAILED DESCRIPTION OF THE PREFERRED EMBODIMENTS

The hybrid carbon fiber spun yarn and the hybrid carbon fiber spun yarn fabric of the present invention will be described in detail in line with the preferred embodiments.

First, the hybrid carbon fiber spun yarn of the present invention will be described.

The hybrid carbon fiber spun yarn of the present invention comprises a core region comprising carbon fibers as a main component, and a surrounding region comprising carbon fibers as a main component and covering an outer peripheral surface of the core region. Twenty percent (20%) by mass or more of fibers forming the core region are long carbon fibers having a fiber length of 500 mm or longer, and eighty percent (80%) by mass or more of fibers forming the surrounding region are short carbon fibers having a fiber length of less than 500 mm. Additionally, a mass ratio between the long carbon fibers and the short carbon fibers (long carbon fibers:short carbon fibers) is in a range of 20:80 to 80:20.

In the hybrid carbon fiber spun yarn of the present invention, 20% by mass or more (still preferably 50% by mass or more, or particularly preferably 80% by mass or more) of fibers forming the core region are long carbon fibers having a fiber length of 500 mm or longer (still preferably 1000 mm or longer, or particularly preferably 3 m or longer). In a case where a content of the long carbon fibers in the fibers forming the core region are less than 20% by mass, tensile strength of the resultant hybrid carbon fiber spun yarn is lowered.

As the long carbon fibers according to the present invention, pitch-based anisotropic carbon fibers, polyacrylonitrile-based carbon fibers (PAN-based carbon fibers), rayon-based carbon fibers, and the like, can be used. Among these described above, from the viewpoint that the cost is comparatively economic, that tensile strength and uniformity of fineness of the resultant hybrid carbon fiber spun yarn are further improved, and that tensile strength and uniformity of thickness of the resultant hybrid carbon fiber spun yarn fabric are further improved, it is preferable to use polyacrylonitrile-based carbon fibers (PAN-based carbon fibers). Moreover, although not particularly limited, an average diameter of the long carbon fibers according to the present invention is preferably within a range of around 5 to 15 μm. Although it is preferable that the average diameter of the long carbon fibers is thinner, the long carbon fibers of which the average diameter is less than the lower limit is unfavorable, by reason that productivity thereof is lowered. On the other hand, the long carbon fibers of which the average diameter exceeds the upper limit is unfavorable, by reason that tensile strength thereof is lowered, and that a thread breakage at the time of twisting is generated easily.

In the core region of the hybrid carbon fiber spun yarn of the present invention, the long carbon fibers account for 20% by mass or more of the core region. As a component other than the long carbon fibers, short carbon fibers having fiber length of less than 500 mm; synthetic resin fibers such as polyamide fibers, polyester fibers, acrylic fibers, or polyethylene terephthalate fibers, may be contained.

Although the long carbon fibers forming the core region of the hybrid carbon fiber spun yarn of the present invention may form a twisted yarn, it may form a fiber bundle which is not twisted.

Moreover, the density of the long carbon fibers according to the present invention is in a range of 1.7 to 2.3 g/cm$^3$, preferably in a range of 1.7 to 2.0 g/cm$^3$, especially preferably in a range of 1.7 to 1.9 g/cm$^3$. If the density of the long carbon fibers is less than 1.7 g/cm$^3$, the strength of the carbon fibers tends to be lowered due to insufficiency of the carbonization thereof. On the other hand, if the density thereof exceeds the upper limit, the strength of the carbon fibers tends to be lowered due to excess of the crystallization thereof.

Furthermore, a method of manufacturing the long carbon fibers according to the present invention is not particularly limited. As the method of manufacturing the long carbon fibers according to the present invention, for example, the method of carbonizing acrylic fibers (PAN fibers) or rayon fibers, the method of making carbon fibers from a mesophase pitch, or the like, are adopted. Moreover, as the long carbon fibers, commercially available long carbon fibers, such as BESFIGHT manufactured by Toho Tenax Co., Ltd., may be used.

Moreover, as for the long carbon fibers according to the present invention, from a viewpoint of improving the tensile strength thereof further, it is preferable to be carbonized prior to a spinning process, and in order to adjust the degree of carbonization, it is still preferable that additional heat treatment is applied to the fiber. As for the temperature of the heat treatment for carbonization, it is preferable to be in a range of around 800 to 3000° C. generally. Moreover, as for the temperature of the heat treatment for adjusting the degree of carbonization, it is preferable to be in a range of around 900 to 2000° C. generally.

In fibers forming the surrounding region of the hybrid carbon fiber spun yarn of the present invention, a content of carbon fibers having a fiber length of less than 500 mm is 80% by mass or more, and it is preferable that a content of carbon fibers having a fiber length of less than 300 mm is 80% by mass or more, and it is still preferable that a content of carbon fibers having a fiber length of less than 200 mm is 80% by mass or more. If the content of the short carbon fibers in the fibers forming the surrounding region is less than 80% by mass, adhesion of the resultant hybrid carbon fiber spun yarn to a matrix material is lowered.

Moreover, in the short carbon fibers according to the present invention, it is preferable that a content of carbon fibers having a fiber length of 150 mm or longer and less than 500 mm is in a range of 3 to 30% by mass, and it is still preferable that the content thereof is in a range of 5 to 20% by mass. If the content of the carbon fibers is less than the lower limit, the tensile strength of the resultant hybrid carbon fiber spun yarn tends to be lowered. On the other hand, if the content of the carbon fibers exceeds the upper limit, the fiber length becomes longer than the interval of rollers at the step where several fiber bundles are drafted to several times by the drawing machine (a fiber bundle is drafted by passing between the rollers having different numbers of rotation) to further improve the degree of parallelization as a single fiber bundle, at the time of manufacturing a spun yarn from a fiber bundle, and it becomes easy to generate a thread breakage, and thereby a massive part such as so-called slab and fly tends to be generated due to fineness fluctuation.

Meanwhile, the carbon fibers having a fiber length of less than 150 mm are formed by cutting carbon fibers in materials suitably at the processing step by a carding machine and a drawing machine. Generally such carbon fibers mainly have a fiber length of 50 mm or longer and less than 150 mm. In the short carbon fibers according to the present invention, it is preferable that such carbon fibers having a fiber length of less than 150 mm are contained in an amount of 97 to 70% by mass in terms of moderate distribution. In carrying out spinning processing only using the carbon fibers having a fiber length of 150 mm or longer, the thickness unevenness of the resultant hybrid carbon fiber spun yarn tend to be generated, and thereby the thickness unevenness of the resultant fabric tend to be generated easily.

Moreover, as the short carbon fibers according to the present invention, pitch-based isotropic carbon fibers, polyacrylonitrile-based carbon fibers (PAN-based carbon fibers), can be used. Among them, from the viewpoint that adhesion thereof to a matrix material is further improved, it is preferable to use pitch-based isotropic carbon fibers. Furthermore, although not particularly limited, an average diameter of the short carbon fibers according to the present invention is preferably within a range of about 5 to 20 μm. If the average diameter of the short carbon fibers is less than the lower limit, the tensile strength thereof becomes low, and the handling thereof becomes difficult, and thereby generation of a dust tend to increase. On the other hand, if the average diameter of the short carbon fibers exceeds the upper limit, the number of the carbon fibers tends to decrease drastically.

In the surrounding region of the hybrid carbon fiber spun yarn of the present invention, the short carbon fibers account for 80% by mass or more of the surrounding region. As a component other than the short carbon fibers, long carbon fibers having fiber length of 500 mm or longer; synthetic resin fibers such as polyamide fibers, polyester fibers, acrylic fibers, or polyethylene terephthalate fibers, may be contained.

As for the short carbon fibers forming the surrounding region of the hybrid carbon fiber spun yarn of the present invention, it is preferable that the short carbon fibers are a twisted yean, and it is still preferable that the surrounding region comprises the twisted yean in an amount of 20% by mass or more, preferably in an amount of 40% by mass or more, still preferably in an amount of 80% by mass or more.

Furthermore, the density of the short carbon fibers according to the present invention is in a range of 1.5 to 1.8 g/cm$^3$, preferably in a range of 1.5 to 1.7 g/cm$^3$, especially preferably in a range of 1.55 to 1.7 g/cm$^3$. If the density of the short carbon fibers is less than the lower limit, the strength of the carbon fibers tends to be lowered due to insufficiency of the carbonization thereof. On the other hand, if the density thereof exceeds the upper limit, the wettability with a resin tends to get worse.

Moreover, a method for manufacturing the short carbon fibers according to the present invention is not particularly limited. For example, as the short carbon fibers, the above-mentioned long carbon fibers cut short may be used. Moreover, in the case of the short carbon fibers which have moderate length, such fibers may be used as it is, or after adjusting fiber length by a cutting machine, it may be used.

Specifically, a spinning method of pitch-based short fibers include a centrifugal method comprising pouring melted pitch out of a nozzle by use of centrifugal force, a melt-blow method comprising blowing melted pitch together with high-temperature and high-speed air, a vortex method comprising forming the high-temperature and high-speed air in the melt-blow method into a vortex shape and drafting by use of such a swirling flow, an air sucker method comprising sucking a fiber into an air sucker nozzle and drafting the fiber, and then collecting the fiber after an exit thereof, and the like. The short carbon fiber bundle or the carbon fiber mat obtained by any of the foregoing methods can be used.

Figure 1:
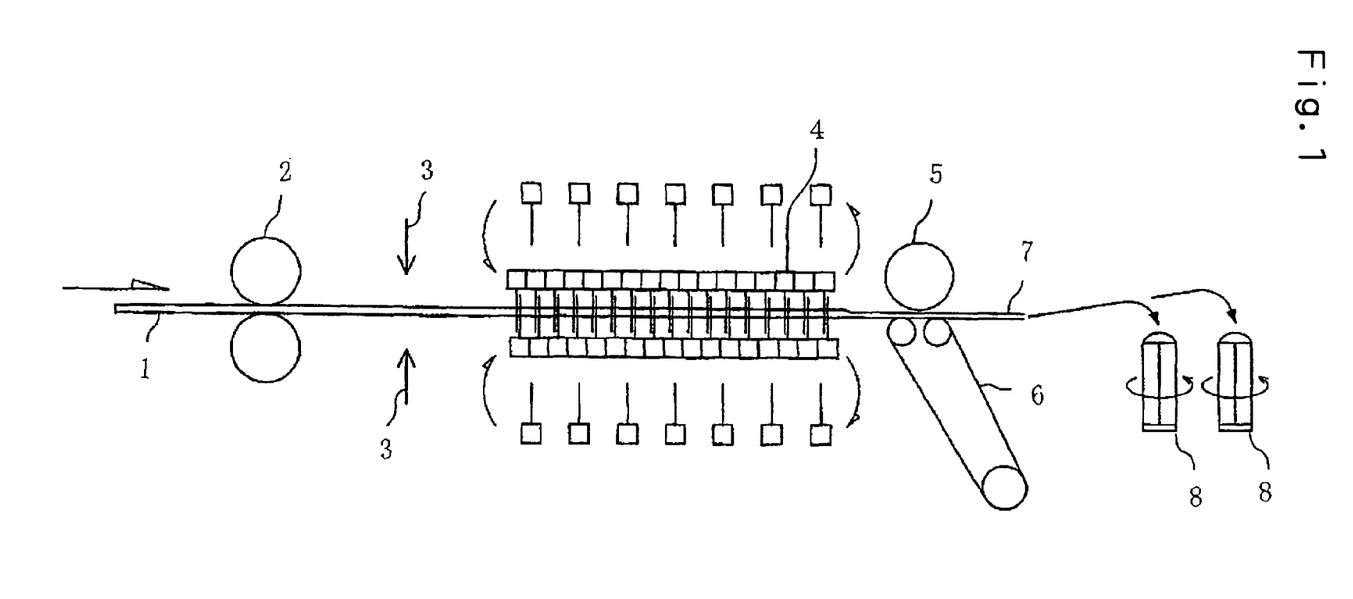
FIG. 1 is a block diagram showing an appropriate carding machine used in a carding step of a process for obtaining a short carbon fiber bundle according to the present invention.

As a process for producing such short carbon fibers according to the present invention, for example, the following process is preferably adopted. Specifically, first, carbon fibers used as the short carbon fibers are appropriately cut with a cutting machine, and then the fibers are aligned with a carding machine assembled as shown in FIG. 1 to obtain a carbon fiber bundle. In such a carding machine shown in FIG. 1, first, a carbon fiber mat 1 is introduced through a back roller 2, and an oil solution 3 is sprayed to the mat. Thereafter, the fibers are drafted by means of a ratio of rim speed between the back roller 2 and a front roller 5 rotating at a faster speed than the back roller 2 while aligned by a faller 4. Subsequently, a carbon fiber bundle sliver 7 is wound into a coiler 8 through an apron 6.

Figure 2:
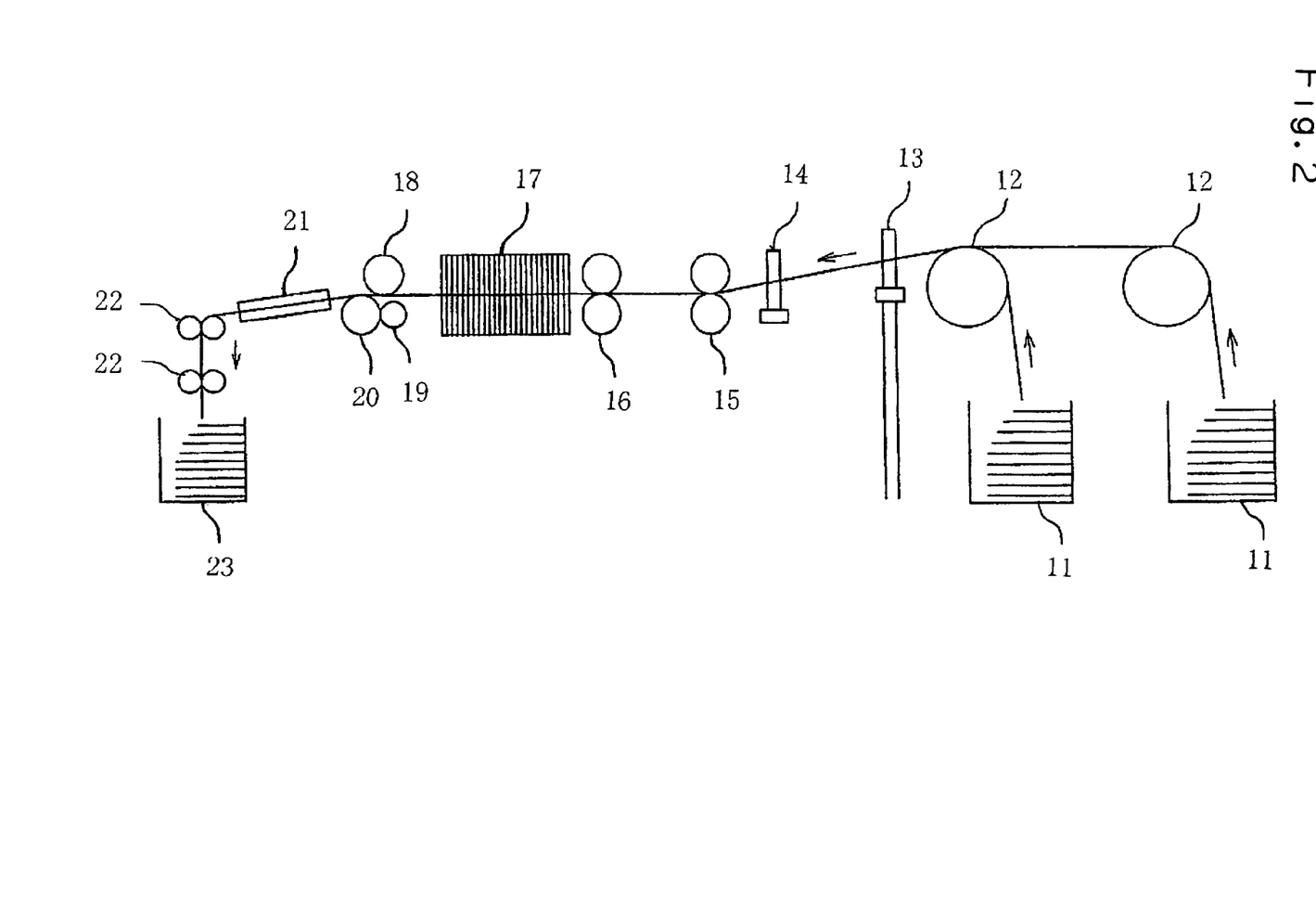
FIG. 2 is a block diagram showing an appropriate drawing machine used in a drawing step of a process for obtaining a short carbon fiber bundle according to the present invention.

Next, several carbon fiber bundles are combined (doubled) together and drafted to several times with a drawing machine assembled as shown in FIG. 2, so that a degree of parallelization of fibers is further improved as a single carbon fiber bundle and the fiber bundle is further thinned down. In such a drawing machine shown in FIG. 2, first, several carbon fiber bundles bringing out from product cases 11 are combined together by creel stands 12, and the combined fiber bundles are led to a back roller 15 through a creel guide 13 and a sliver guide 14. Further, the carbon fiber bundles are fed to a middle roller 16, and the fiber bundles are fed among a front roller 18, a nip roller 19 and a top roller 20 while the fibers are aligned by a faller 17. The carbon fiber bundle drafted during this time is placed in a product case 23 through a sliver guide 21 and rollers 22. Note that such drawing processes may be repeated several times.

Further, the short carbon fibers according to the present invention are preferably heat-treated prior to forming a spun yarn from the viewpoint that tensile strength thereof is further improved. The heat-treatment temperature is preferably in the range of around 700 to 3000° C., still preferably in the range of around 800 to 1500° C.

The hybrid carbon fiber spun yarn of the present invention has a core region comprising the above-mentioned long carbon fibers as a main component and a surrounding region comprising the above-mentioned short carbon fibers as a main component. The outer peripheral surface of the core region is covered with the surrounding region.

In such a hybrid carbon fiber spun yarn of the present invention, a mass ratio between the long carbon fibers and the short carbon fibers (long carbon fibers:short carbon fibers) is preferably in the range of 20:80 to 80:20, still preferably in the range of 30:70 to 70:30. If the content of the long carbon fibers is less than the lower limit, tensile strength of the resultant hybrid carbon fiber spun yarn is lowered. On the other hand, if the content of the short carbon fibers is less than the lower limit, adhesion of the resultant hybrid carbon fiber spun yarn to a matrix material is lowered.

In the hybrid carbon fiber spun yarn of the present invention, although the outer peripheral surface of the core region is covered with the surrounding region, the specific configuration thereof is not particularly limited. It is preferred that the surrounding region is formed of twisted yarns comprising the short carbon fibers as a main component, and that the outer peripheral surface of the core region is covered with the twisted yarns by means of twisting the twisted yarns together with the core region comprising the long carbon fibers as a main component.

Further, a size of the hybrid carbon fiber spun yarn of the present invention is not particularly limited. The size, represented by a unit "tex" that denotes mass (g) per 1000 m thereof, is preferably in the range of around 30 to 500 tex, still preferably in the range of around 30 to 150 tex, still more preferably in the range of around 30 to 100 tex, particularly preferably in the range of around 30 to 80 tex. If the size of the hybrid carbon fiber spun yarn of the present invention exceeds the upper limit, it tends to difficult to obtain a thin fabric. On the other hand, if it is less than the lower limit, it tends to difficult to attain a strength suitable for weaving, and gas permeability of the resultant fabric tends to be lowered.

Moreover, in the hybrid carbon fiber spun yarn of the present invention, since the twist number thereof affects the strength, the twist number is preferably in the range from 50 to 400 turns/m, still preferably in the range from 100 to 200 turns/m. If the twist number exceeds the upper limit, a possibility that the fibers are broken tends to develop. On the other hand, if it is less than the lower limit, tensile strength of the resultant hybrid carbon fiber spun yarn tends to be lowered. In addition, two or more of the hybrid carbon fiber spun yarns of the present invention may be combined together with a twisting machine to double them. In such a case, for example, of two yarns, reverse twists are preferably performed as secondary twists in 60%±5% of the number of primary twists. Alternatively, in the case of three yarns, reverse twists are preferably performed as secondary twists in 55%±5% of the number of primary twists.

The hybrid carbon fiber spun yarn of the present invention has the above-mentioned configuration, so that it can have high tensile strength of 0.35 N/tex or above, preferably very high tensile strength of 0.40 N/tex or above.

Figure 3:
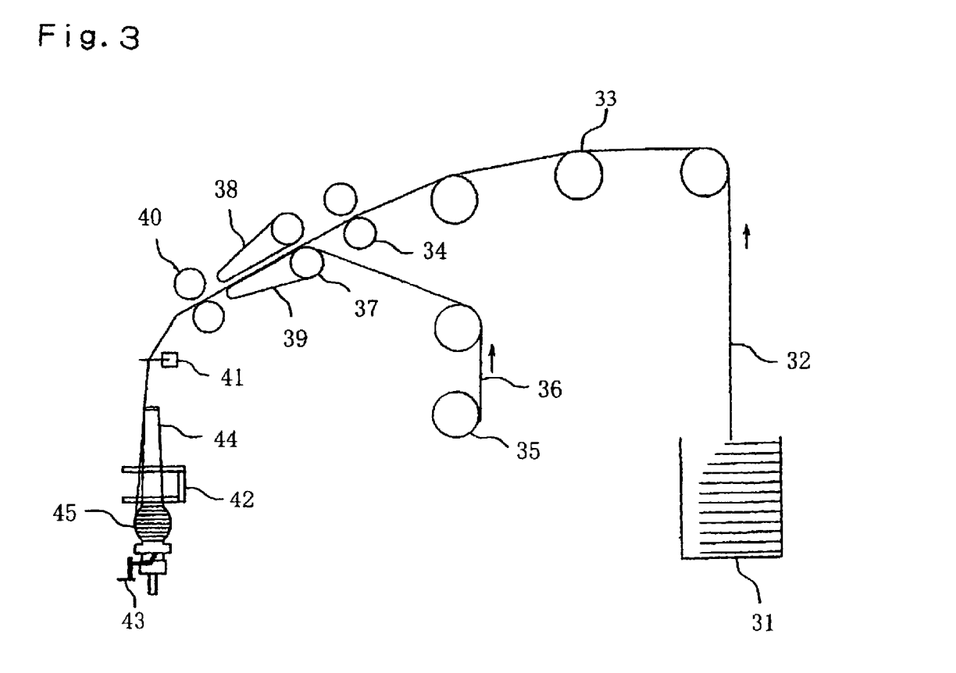
FIG. 3 is a block diagram showing an appropriate fine spinning machine used for manufacturing a hybrid carbon fiber spun yarn of the present invention.

A process for producing such a hybrid carbon fiber spun yarn of the present invention is not particularly limited. For example, the following process is preferably adopted. Specifically, when a carbon fiber bundle of the short carbon fibers is further drafted and twisted with a fine spinning machine assembled as shown in FIG. 3, a long carbon fiber bundle used as long carbon fibers is introduced through a middle roller to mix-spin them. In such a fine spinning machine shown in FIG. 3, first, the short carbon fiber bundle 32 is led from a product case 31 to a back roller 34 through creel stand rollers 33. Meanwhile, the long carbon fiber bundle 36 is introduced from a bobbin (for carbon fibers) 35 through a middle roller 37. Subsequently, during feeding among an apron 38, a bottom roller 39 and front rollers 40, the short carbon fiber bundle 32 is drafted by means of a ratio of rim speed between the front roller 40 and the back roller 34 while combined with the long carbon fiber bundle. Subsequently, the both fiber bundles combined pass through a snail guide 41, and then they are twisted by a spindle 44 comprising a ring 42 and a brake pedal 43. The twisted fiber bundle is wound into a wind-up bobbin 45. In this way, the hybrid carbon fiber spun yarn of the present 15 invention can be produced.

Figure 4:
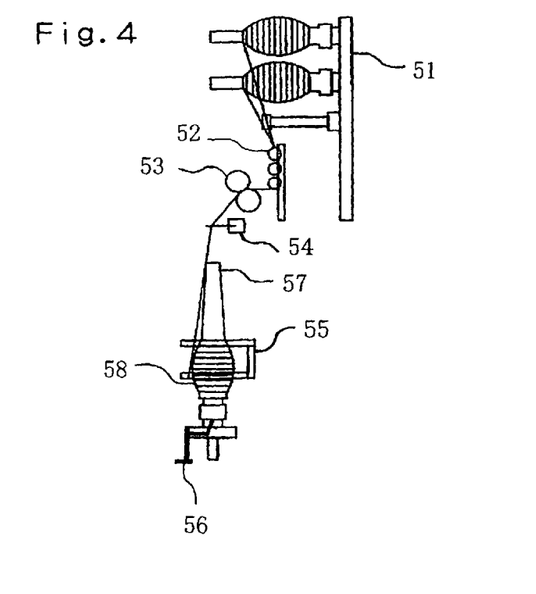
FIG. 4 is a block diagram showing an appropriate twisting machine used for manufacturing organzines of a hybrid carbon fiber spun yarn of the present invention.

Further, it is advantageous that the hybrid carbon fiber spun yarn of the present invention is formed in the form of a single twisted yarn in order to obtain a fine yarn. When needed, however, a organzine can be formed with a twisting machine assembled as shown in FIG. 4. In such a twisting machine shown in FIG. 4, first, two single twisted yarns are combined by a creel stand 51. The combined yarns pass through a sliver guide 52, a front guide 53 and a snail guide 54, and then they are twisted by a spindle 57 comprising a ring 55 and a brake pedal 56. The twisted yarn is wound into a wind-up bobbin 58. In this way, the organzine of the hybrid carbon fiber spun yarn can be produced.

Next, the hybrid carbon fiber spun yarn fabric of the present invention will be described.

The hybrid carbon fiber spun yarn fabric of the present invention contains the hybrid carbon fiber spun yarns of the present invention in an amount of 30% by mass or more (preferably 40% by mass or more). If the content of the hybrid carbon fiber spun yarns contained in the hybrid carbon fiber spun yarn fabric of the present invention is less than 30% by mass, the adhesion of the resultant fabric to a matrix material is lowered, and the improvement of the mechanical strength of the resultant fabric can not be attained.

A specific weaving method for obtaining the hybrid carbon fiber spun yarn fabric of the present invention is not particularly limited. For example, a plain weave, a satin weave, a twill weave, a basket weave, or the like is appropriately adopted. Among them, the plain weave is preferred.

Further, when obtaining the hybrid carbon fiber spun yarn fabric of the present invention, the hybrid carbon fiber spun yarns of the present invention may be used as at least either warps or wefts capable of effectively using the strength of the spun yarn, and the hybrid carbon fiber spun yarns of the present invention are preferably used as both of warps and wefts.

In addition, the hybrid carbon fiber spun yarns of the present invention account for 30% by mass or more of the hybrid carbon fiber spun yarn fabric of the present invention. As a component other than the hybrid carbon fiber spun yarn, another carbon fiber spun yarn, or a spun yarn formed of synthetic resin fibers such as polyamide fibers, polyester fibers, acrylic fibers or polyethylene terephthalate fibers may be contained.

The usage of the hybrid carbon fiber spun yarn fabric of the present invention, thus obtained, is not particularly limited, but the spun yarn fabric is preferably used as a gas diffuser of a solid polymer electrolyte fuel cell.

A volume resistivity of the hybrid carbon fiber spun yarn fabric of the present invention is preferably in the range from 20 to 1500 $\mu\Omega\cdot m$, still preferably in the range from 50 to 700 $\mu\Omega\cdot m$, and particularly preferably in the range from 50 to 400 $\mu\Omega\cdot m$. Further, a FAW (Fiber Area Weight) of the hybrid carbon fiber spun yarn fabric of the present invention is preferably in the range from 50 to 600 $g/m^2$, still preferably in the range from 70 to 400 $g/m^2$, and particularly preferably in the range from 80 to 200 $g/m^2$. In the case where the spun yarn fabric is used as a gas diffuser, if the FAW of the fabric exceeds the upper limit, an electric power collection ability is improved, but gas permeability tends to be lowered due to a decrease in air-gaps. On the other hand, if the FAW of the fabric is less than the lower limit, an electric power collection ability tends to be lowered due to a reduction of contact with a catalyst layer.

Furthermore, a thickness of the hybrid carbon fiber spun yarn fabric of the present invention is not particularly limited, but is preferably in the range from 0.10 to 1.00 mm, still preferably in the range from 0.10 to 0.60 mm, and particularly preferably in the range from 0.10 to 0.40 mm. In the case where the spun yarn fabric is used as a gas diffuser, if the thickness of the fabric exceeds the upper limit, there is a tendency that air permeabillity is difficult to be retained. On the other hand, if the thickness of the fabric is less than the lower limit, there is a tendency that it takes a long time for diffusion of a reactive gas, so that a battery performance is lowered.

EXAMPLES

The present invention will be described more in detail through Examples and Comparative Examples. However, the present invention will not be limited to them. Note that, a density of a carbon fiber, tensile strength of a spun yarn, adhesion of a spun yarn to a matrix material, and a thickness of a spun yarn fabric were each evaluated or measured by the following procedures.

(i) Measurement of Density by Density Gradient Tube Method:

(Preparation of Specific Gravity Solution)

Zinc chloride and 1% of hydrochloric acid were each weighed in a beaker in a predetermined amount, followed by being mixed. The obtained mixed solution was transferred into a 500 mL graduated cylinder. The graduated cylinder was placed in a low temperature thermostat water bath at 20±1.0° C. After the temperature of the mixed solution reached at 20±1.0° C., a specific gravity meter was allowed to float on the mixed solution to measure a specific gravity of the mixed solution. The relative amounts of zinc chloride and 1% of hydrochloric acid were arbitrarily changed to prepare 10 kinds of specific gravity solutions.

(Measurement of Density of a Sample)

2 mL of each of the 10 kinds of specific gravity solutions calmly ran down the inner wall of a 20 mL graduated cylinder in order of decreasing the specific gravity to be poured into the cylinder, and thereby the density gradient tube was prepared. Meanwhile, about 0.1 g of a carbon fiber sample ground in a mortar and passing through a standard sieve of an opening of 150 μm was dispersed in a small amount of ethanol to prepare a sample dispersion. Subsequently, this density gradient tube was placed in a low temperature thermostat water bath at 20±1.0° C. In 30 min after the immersion, the samples dispersion was calmly poured into the density gradient tube, followed by standing for 12 hrs or longer. In 12 hrs or longer after standing, a position of the sample in the density gradient tube was read to determine a density of the sample using a density conversion table.

(ii) Measurement of Tensile Strength of a Spun Yarn:

A spun yarn was drawn with a tensile tester ("TENSILON Universal Material Testing Instrument, Model 1310" made by ORIENTEC Co., LTD.) under conditions of a length of the spun yarn between grips of 300 mm and a tensile speed of 200 mm/min to measure breaking strength. This breaking strength was divided by tex of the spun yarn to determine tensile strength of the spun yarn.

(iii) Evaluation of adhesion to a Matrix Material:

Adhesion of the spun yarn to a matrix material was evaluated by the following procedure. Specifically, a hybrid carbon fiber spun yarn fabric impregnated with a phenol resin ("PL-4804" made by Gunei Chemical Industry Co., Ltd.) was dried in hot air at a temperature of 40 to 80° C. for 24 hrs. (These impregnation and drying were repeated until the mass ratios of the hybrid carbon fiber spun yarn fabric and the phenol resin fell within the ranges of 38 to 46% by mass and 54 to 62% by mass, respectively.) Thereafter, the 10 sheets of spun yarn fabrics were laminated, and the resultant fabric laminate was cured and press-molded at a temperature of 170° C. and a pressure of 0.06 MPa for 1 hr, followed by being heat-treated in a vacuum furnace at 2000° C. for 1 hr. Subsequently, the resultant fabric laminate was brought out of the furnace to be used as a sample. The sample was cut with a cutter such that the cut surface passed through a neighborhood of a center of the sample, and then the cut surface of the laminate was visually observed at ordinary temperature. When no crack occurred at an interface of the hybrid carbon fiber spun yarn fabrics, the fabric laminate was regarded as "Accepted (A)". If a crack occurred, the fabric laminate was regarded as "Rejected (C)".

(iv) Measurement of Thickness of a Spun Yarn Fabric:

A thickness of the spun yarn fabric was measured according to the method 1 described in Testing Method for Carbon Fiber Cloth (JCFS003-1982). Specifically, a thickness of each of 5 test specimens of 100 mm×100 mm was measured with a non-rotating spindle type paper micrometer "Model PPM-25" (made by Mitutoyo Corporation). The spindle was gently rotated to bring the measuring surface into contact with the surface of the sample in parallel, and the scale was read when the ratchet made the sound three times. The average value of the measured values was calculated to 2 decimal places.

Manufacturing Example 1

Manufacturing a Pitch-Based Isotropic Carbon Fiber Bundle of 660 Tex, Heat-Treated at a Heat Temperature of 1000° C.

Pitch-based isotropic carbon fiber bundles ("KRECA Tow T-101S" made by KUREHA CORPORATION, 23 g/m) were used. In a drawing process using four drawing machines which were each assembled as shown in FIG. 2, two carbon fiber bundles of this type were combined together and drafted to 4.0 times with the first drawing machine to form a single carbon fiber bundle. Subsequently, two carbon fiber bundles of this type were combined together and drafted to 5.3 times with the second drawing machine to form a single carbon fiber bundle. Further, two carbon fiber bundles of this type were combined together and drafted to 5.3 times with the third drawing machine to form a single carbon fiber bundle. Moreover, two carbon fiber bundles of this type were combined together and drafted to 5.0 times with the fourth drawing machine to form a single pitch-based isotropic carbon fiber bundle of 0.66 g/m (660 tex).

Manufacturing Example 2

Manufacturing a Pitch-Based Isotropic Carbon Fiber Bundle of 920 Tex, Heat-Treated at a Heat Temperature of 1000° C.

Pitch-based isotropic carbon fiber bundles ("KRECA Tow T-101S" made by KUREHA CORPORATION, 23 g/m) were used. In a drawing process using four drawing machines which were each assembled as shown in FIG. 2, two carbon fiber bundles of this type were combined together and drafted to 5.0 times with the first drawing machine to form a single carbon fiber bundle. Subsequently, two carbon fiber bundles of this type were combined together and drafted to 5.0 times with the second drawing machine to form a single carbon fiber bundle. Further, two carbon fiber bundles of this type were combined together and drafted to 4.0 times with the third drawing machine to form a single carbon fiber bundle. Moreover, two carbon fiber bundles of this type were combined together and drafted to 4.0 times with the fourth drawing machine to form a single pitch-based isotropic carbon fiber bundle of 0.92 g/m (920 tex).

Manufacturing Example 3

Manufacturing a Pitch-Based Isotropic Carbon Fiber Bundle of 398 Tex, Heat-Treated at a Heat Temperature of 1000° C.

Pitch-based isotropic carbon fiber bundles ("KRECA Tow T-101S" made by KUREHA CORPORATION, 23 g/m) were used. In a drawing process using four drawing machines which were each assembled as shown in FIG. 2, a single carbon fiber bundle of this type was drafted to 5.0 times with the first drawing machine to form a single carbon fiber bundle. Subsequently, two carbon fiber bundles of this type were combined together and drafted to 5.0 times with the second drawing machine to form a single carbon fiber bundle. Further, two carbon fiber bundles of this type were combined together and drafted to 4.3 times with the third drawing machine to form a single carbon fiber bundle. Moreover, two carbon fiber bundles of this type were combined together and drafted to 4.3 times with the fourth drawing machine to form a single pitch-based isotropic carbon fiber bundle of 0.398 g/m (398 tex).

Manufacturing Example 4

Manufacturing a Pitch-Based Isotropic Carbon Fiber Bundle of 1640 Tex, Heat-Treated at a Heat Temperature of 1000° C.

Pitch-based isotropic carbon fiber bundles ("KRECA Tow T-101S" made by KUREHA CORPORATION, 23 g/m) were used. In a drawing process using four drawing machines which were each assembled as shown in FIG. 2, two carbon fiber bundles of this type were combined together and drafted to 4.0 times with the first drawing machine to form a single carbon fiber bundle. Subsequently, two carbon fiber bundles of this type were combined together and drafted to 4.0 times with the second drawing machine to form a single carbon fiber bundle. Further, two carbon fiber bundles of this type were combined together and drafted to 4.0 times with the third drawing machine to form a single carbon fiber bundle. Moreover, two carbon fiber bundles of this type were combined together and drafted to 3.5 times with the fourth drawing machine to form a single pitch-based isotropic carbon fiber bundle of 1.64 g/m (1640 tex).

Manufacturing Example 5

Manufacturing a Pitch-Based Isotropic Carbon Fiber Bundle of 4000 Tex, Heat-Treated at a Heat Temperature of 1000° C.

Pitch-based isotropic carbon fiber bundles ("KRECA Tow T-101S" made by KUREHA CORPORATION, 23 g/m) were used. In a drawing process using four drawing machines which were each assembled as shown in FIG. 2, two carbon fiber bundles of this type were combined together and drafted to 3.5 times with the first drawing machine to form a single carbon fiber bundle. Subsequently, two carbon fiber bundles of this type were combined together and drafted to 3.0 times with the second drawing machine to form a single carbon fiber bundle. Further, two carbon fiber bundles of this type were combined together and drafted to 3.0 times with the third drawing machine to form a single carbon fiber bundle. Moreover, two carbon fiber bundles of this type were combined together and drafted to 2.9 times with the fourth drawing machine to form a single pitch-based isotropic carbon fiber bundle of 4.0 g/m (4000 tex).

Manufacturing Example 6

Manufacturing a PAN-Based Carbon Fiber Bundle of 660 Tex

PAN-based continuous carbon fibers of 200 tex ("BESFIGHT HTA-3K" made by Toho Tenax Co., Ltd.) were cut into fibers of 200 mm long with a cutting machine, and then the fibers were aligned with a carding machine to form a fiber bundle of 10 g/m. Subsequently, in a drawing process using three drawing machines which were each assembled as shown in FIG. 2, a single fiber bundle of this type was drafted to 5.0 times with the first drawing machine to form a single carbon fiber bundle. Further, two carbon fiber bundles of this type were combined together and drafted to 3.9 times with the second drawing machine to form a single carbon fiber bundle. Moreover, two carbon fiber bundles of this type were combined together and drafted to 3.1 times with the third drawing machine to form a single PAN-based carbon fiber bundle of 0.66 g/m (660 tex).

Manufacturing Example 7

Manufacturing a Pitch-Based Isotropic Carbon Fiber Bundle of 1187 Tex, Heat-Treated at a Heat Temperature of 1000° C.

Pitch-based isotropic carbon fiber bundles ("KRECA Tow T-101S" made by KUREHA CORPORATION, 23 g/m) were used. In a drawing process using four drawing machines which were each assembled as shown in FIG. 2, two carbon fiber bundles of this type were combined together and drafted to 5.0 times with the first drawing machine to form a single carbon fiber bundle. Subsequently, two carbon fiber bundles of this type were combined together and drafted to 5.0 times with the second drawing machine to form a single carbon fiber bundle. Further, two carbon fiber bundles of this type were combined together and drafted to 4.0 times with the third drawing machine to form a single carbon fiber bundle. Moreover, two carbon fiber bundles of this type were combined together and drafted to 3.1 times with the fourth drawing machine to form a single pitch-based isotropic carbon fiber bundle of 1.187 g/m (1187 tex).

Manufacturing Example 8

Manufacturing a Pitch-Based Isotropic Carbon Fiber Bundle of 132 Tex, Heat-Treated at a Heat Temperature of 1000° C.

Pitch-based isotropic carbon fiber bundles ("KRECA Tow T-101S" made by KUREHA CORPORATION, 23 g/m) were used. In a drawing process using five drawing machines which were each assembled as shown in FIG. 2, two carbon fiber bundles of this type were combined together and drafted to 4.0 times with the first drawing machine to form a single carbon fiber bundle. Subsequently, two carbon fiber bundles of this type were combined together and drafted to 5.2 times with the second drawing machine to form a single carbon fiber bundle. Further, two carbon fiber bundles of this type were combined together and drafted to 5.2 times with the third drawing machine to form a single carbon fiber bundle. Moreover, two carbon fiber bundles of this type were combined together and drafted to 5.2 times with the fourth drawing machine to form a single carbon fiber bundle. Furthermore, a single carbon fiber bundle of this type was drafted to 5.0 times with the fifth drawing machine to form a single pitch-based isotropic carbon fiber bundle of 0.132 g/m (132 tex).

Example 1

The pitch-based isotropic short carbon fiber bundle of 660 tex, heat-treated at a heat temperature of 1000° C., obtained in Manufacturing Example 1, and a long carbon fiber bundle of PAN-based continuous carbon fibers of 33 tex ("BESFIGHT HTA-W05K" made by Toho Tenax Co., Ltd.) were used as carbon fibers forming a surrounding region and carbon fibers forming a core region, respectively, to form a hybrid carbon fiber spun yarn according to the following procedure. Specifically, when the short carbon fiber bundle 32 was spun at the number of Z (left) twists of 185 turns/m while drafted to 20 times with a fine spinning machine assembled as shown in FIG. 3, the long carbon fiber bundle 36 was simultaneously introduced through a middle roller 37, and the short carbon fiber bundle and the long carbon fiber bundle were mix-spun to form a hybrid carbon fiber spun yarn of 66 tex.

In the hybrid carbon fiber spun yarn thus obtained, a single twisted yarn formed of the short carbon fiber bundle was twisted together with the core region formed of the long carbon fiber bundle, whereby the outer peripheral surface of the core region was completely covered with the twisted yarn (the surrounding region) wound around the core region. Further, the resultant hybrid carbon fiber spun yarn had narrow distribution of fineness and sufficiently high uniformity of fineness.

Further, a hybrid carbon fiber spun yarn fabric having an FAW of 95 g/m$^2$ and a thickness of 0.12 mm was plain-woven using the hybrid carbon fiber spun yarn.

Example 2

A hybrid carbon fiber spun yarn of 66 tex was obtained in the same manner as in Example 1, except that the pitch-based isotropic carbon fiber bundle of 920 tex, obtained in Manufacturing Example 2, was used instead of the pitch-based isotropic carbon fiber bundle obtained in Manufacturing Example 1, and that a long carbon fiber bundle of PAN-based continuous fibers of 20 tex (prepared by raveling a long carbon fiber bundle of PAN-based continuous fibers of 33 tex ("BESFIGHT HTA-W1K" made by Toho Tenax Co., Ltd.)) was used as the long carbon fiber bundle. The hybrid carbon fiber spun yarn thus obtained had similar configuration to one obtained in Example 1, and had sufficiently high uniformity of fineness.

Further, a hybrid carbon fiber spun yarn fabric having an FAW of 95 g/m$^2$ and a thickness of 0.12 mm was plain-woven using the hybrid carbon fiber spun yarn.

Example 3

A hybrid carbon fiber spun yarn of 66 tex was obtained in the same manner as in Example 1, except that the pitch-based isotropic carbon fiber bundle of 398 tex, obtained in Manufacturing Example 3, was used instead of the pitch-based isotropic carbon fiber bundle obtained in Manufacturing Example 1, and that a long carbon fiber bundle of 46 tex formed by combining a single long carbon fiber bundle of PAN-based continuous fibers of 33 tex ("BESFIGHT HTA-W1K" made by Toho Tenax Co., Ltd.) with a single long carbon fiber bundle of PAN-based continuous fibers of 13 tex prepared by raveling the "BESFIGHT HTA-W1K" was used as the long carbon fiber bundle. The hybrid carbon fiber spun yarn thus obtained had similar configuration to one obtained in Example 1, and had sufficiently high uniformity of fineness.

Further, a hybrid carbon fiber spun yarn fabric having an FAW of 95 g/m$^2$ and a thickness of 0.12 mm was plain-woven using the hybrid carbon fiber spun yarn.

Example 4

A hybrid carbon fiber spun yarn of 66 tex was obtained in the same manner as in Example 1, except that a long carbon fiber bundle of PAN-based continuous fibers of 33 tex (prepared by raveling "TORAYCA M40" made by Toray Industries, Inc.) was used as the long carbon fiber bundle. The hybrid carbon fiber spun yarn thus obtained had similar configuration to one obtained in Example 1, and had sufficiently high uniformity of fineness.

Further, a hybrid carbon fiber spun yarn fabric having an FAW of 95 g/m$^2$ and a thickness of 0.12 mm was plain-woven using the hybrid carbon fiber spun yarn.

Example 5

A hybrid carbon fiber spun yarn fabric having an FAW of 95 g/m$^2$ and a thickness of 0.12 mm was obtained in the same manner as in Example 1, except that the weaving method was changed from a plain weave to a twill weave.

Example 6

A hybrid carbon fiber spun yarn of 149 tex was obtained in the same manner as in Example 1, except that the pitch-based isotropic carbon fiber bundle of 1640 tex, obtained in Manufacturing Example 4, was used instead of the pitch-based isotropic carbon fiber bundle obtained in Manufacturing Example 1, and that a long carbon fiber bundle of PAN-based continuous fibers of 67 tex ("BESFIGHT HTA-W1K" made by Toho Tenax Co., Ltd.) was used as the long carbon fiber bundle. The hybrid carbon fiber spun yarn thus obtained had similar configuration to one obtained in Example 1, and had sufficiently high uniformity of fineness.

Further, a hybrid carbon fiber spun yarn fabric having an FAW of 150 g/m$^2$ and a thickness of 0.20 mm was plain-woven using the hybrid carbon fiber spun yarn.

Example 7

A hybrid carbon fiber spun yarn of 400 tex was obtained in the same manner as in Example 1, except that the pitch-based isotropic carbon fiber bundle of 4000 tex, obtained in Manufacturing Example 5, was used instead of the pitch-based isotropic carbon fiber bundle obtained in Manufacturing Example 1, and that a long carbon fiber bundle of PAN-based continuous fibers of 200 tex ("BESFIGHT HTA-3K" made by Toho Tenax Co., Ltd.) was used as the long carbon fiber bundle. The hybrid carbon fiber spun yarn thus obtained had similar configuration to one obtained in Example 1, and had sufficiently high uniformity of fineness.

Further, a hybrid carbon fiber spun yarn fabric having an FAW of 515 g/m$^2$ and a thickness of 0.83 mm was plain-woven using the hybrid carbon fiber spun yarn.

Example 8

A hybrid carbon fiber spun yarn of 66 tex was obtained in the same manner as in Example 1, except that a long carbon fiber bundle of pitch-based anisotropic continuous fibers of 33 tex (prepared by raveling "DIALEAD K32112" made by Mitsubishi Chemical Functional Products, Inc.) was used as the long carbon fiber bundle. The hybrid carbon fiber spun yarn thus obtained had similar configuration to one obtained in Example 1, and had sufficiently high uniformity of fineness.

Further, a hybrid carbon fiber spun yarn fabric having an FAW of 95 g/m$^2$ and a thickness of 0.12 mm was plain-woven using the hybrid carbon fiber spun yarn.

Example 9

A hybrid carbon fiber spun yarn of 66 tex was obtained in the same manner as in Example 1, except that the PAN-based carbon fiber bundle of 660 tex, obtained in Manufacturing Example 6, was used instead of the pitch-based isotropic carbon fiber bundle obtained in Manufacturing Example 1. The hybrid carbon fiber spun yarn thus obtained had similar configuration to one obtained in Example 1, and had sufficiently high uniformity of fineness.

Further, a hybrid carbon fiber spun yarn fabric having an FAW of 95 g/m² and a thickness of 0.12 mm was plain-woven using the hybrid carbon fiber spun yarn.

Comparative Example 1

A pitch-based isotropic carbon fiber spun yarn of 66 tex was obtained in the same manner as in Example 1, except that the pitch-based isotropic carbon fiber bundle obtained in Manufacturing Example 1 was used alone without the long carbon fiber bundle, and that the short carbon fiber bundle 32 was drafted to 10 times instead of 20 times. The pitch-based isotropic carbon fiber spun yarn thus obtained had wide distribution of fineness.

Further, a pitch-based isotropic carbon fiber spun yarn fabric having an FAW of 95 g/m² and a thickness of 0.12 mm was plain-woven using the pitch-based isotropic carbon fiber spun yarn.

Comparative Example 2

A PAN-based carbon fiber fabric having an FAW of 95 g/m² and a thickness of 0.12 mm was plain-woven using alone a long carbon fiber bundle of PAN-based continuous fibers of 66 tex prepared by raveling a long carbon fiber bundle of PAN-based continuous fibers of 67 tex ("BESFIGHT HTA-W1K" made by Toho Tenax Co., Ltd.).

Comparative Example 3

A hybrid carbon fiber spun yarn of 66 tex was obtained in the same manner as in Example 1, except that the pitch-based isotropic carbon fiber bundle of 1187 tex, obtained in Manufacturing Example 7, was used instead of the pitch-based isotropic carbon fiber bundle obtained in Manufacturing Example 1, and that a long carbon fiber bundle of PAN-based continuous fibers of 6.6 tex (prepared by raveling a long carbon fiber bundle of PAN-based continuous fibers of 33 tex ("BESFIGHT HTA-W05K" made by Toho Tenax Co., Ltd.)) was used as the long carbon fiber bundle.

Further, a hybrid carbon fiber spun yarn fabric having an FAW of 95 g/m² and a thickness of 0.12 mm was plain-woven using the hybrid carbon fiber spun yarn.

Comparative Example 4

A hybrid carbon fiber spun yarn of 66 tex was obtained in the same manner as in Example 1, except that the pitch-based isotropic carbon fiber bundle of 132 tex, obtained in Manufacturing Example 8, was used instead of the pitch-based isotropic carbon fiber bundle obtained in Manufacturing Example 1, and that a long carbon fiber bundle of 59.4 tex formed by combining a single long carbon fiber bundle of PAN-based continuous fibers of 33 tex ("BESFIGHT HTA-W05K" made by Toho Tenax Co., Ltd.) with a single long carbon fiber bundle of PAN-based continuous fibers of 26.4 tex prepared by raveling the "BESFIGHT HTA-W05K" was used as the long carbon fiber bundle.

Further, a hybrid carbon fiber spun yarn fabric having an FAW of 95 g/m² and a thickness of 0.12 mm was plain-woven using the hybrid carbon fiber spun yarn.

<Evaluation Results>

For the hybrid carbon fiber spun yarns obtained in Examples 1 to 9 and Comparative Examples 1 to 4, the density, length and tensile strength of each of the carbon fibers forming the core region and the surrounding region are listed in FIG. 5. Further, the contents of the long carbon fibers and the short carbon fibers contained in the each hybrid carbon fiber spun yarn, and the fineness, tensile strength and adhesion (to a matrix material) of the each hybrid carbon fiber spun yearn are listed in FIG. 5. Furthermore, the thickness, FAW (Fiber Area Weight) and weaving method of the hybrid carbon fiber spun yarn fabric obtained in Examples 1 to 9 and Comparative Examples 1 to 4 are listed in FIG. 5.

As apparent from the results shown in Table 1, it is observed that the hybrid carbon fiber spun yarns of the present invention (Examples 1 to 9) have a sufficiently high tensile strength and a sufficiently excellent adhesion to a matrix material, and a sufficiently high uniformity of fineness as well, as described above. Accordingly, the hybrid carbon fiber spun yarn fabrics of the present invention (Examples 1 to 9) obtained using the hybrid carbon fiber spun yarns of the present invention are excellent in adhesion to a matrix material and mechanical strength, and excellent in uniformity of thickness as well.

INDUSTRIAL APPLICABILITY

As described above, the present invention can provide the hybrid carbon fiber spun yarns having a high tensile strength without leading to a decrease in adhesion to a matrix material such as a polymeric material, and having an excellent uniformity of fineness as well. Therefore, the hybrid carbon fiber spun yarns of the present invention are very useful as fibers for a gas diffuser of a solid polymer electrolyte fuel cell, fibers for a composite reinforcement in the field of space aeronautics, and the like.

Further, the present invention can provide the carbon fiber spun yarn fabrics having an excellent adhesion to a matrix material and a mechanical strength, and having an excellent uniformity of thickness as well. Accordingly, the hybrid carbon fiber spun yarn fabrics of the present invention are very useful as carbon fiber fabrics used for a gas diffuser of a solid polymer electrolyte fuel cell, a C/C composite material, a heater, a fabric, a reinforcement material for molded heat insulation material and the like.

The invention claimed is:

1. A hybrid carbon fiber spun yarn comprising a core region which comprises carbon fibers as a main component, and a surrounding region which comprises carbon fibers as a main component and covers an outer peripheral surface of the core region;
    wherein 20% by mass or more of fibers forming the core region are long carbon fibers having a fiber length of 500 mm or longer,
    80% by mass or more of fibers forming the surrounding region are short carbon fibers having a fiber length of less than 500 mm, and
    a mass ratio between the long carbon fibers and the short carbon fibers (long carbon fibers:short carbon fibers) is in a range of 20:80 to 80:20.

2. The hybrid carbon fiber spun yarn according to claim 1, wherein the long carbon fibers are at least one kind of carbon fibers selected from the group consisting of pitch-based anisotropic carbon fibers, polyacrylonitrile-based carbon fibers, and rayon-based carbon fibers.

3. The hybrid carbon fiber spun yarn according to claim 1, wherein the short carbon fibers are pitch-based isotropic carbon fibers and/or polyacrylonitrile-based carbon fibers.

4. The hybrid carbon fiber spun yarn according to claim 1, wherein the long carbon fibers are polyacrylonitrile-based carbon fibers, and the short carbon fibers are pitch-based isotropic carbon fibers.

5. The hybrid carbon fiber spun yarn according to claim 1, wherein a content of carbon fibers having a fiber length of 150 mm or longer and less than 500 mm in the short carbon fibers is in a range of 3 to 30% by mass.

6. The hybrid carbon fiber spun yarn according to claim 1, wherein the surrounding region comprises a twisted yarn comprising the short carbon fibers as a main component, and the outer peripheral surface of the core region is covered with the twisted yarn by twisting the twisted yarn together with the core region comprising the long carbon fibers as a main component.

7. The hybrid carbon fiber spun yarn according to claim 6, wherein a twist number of the hybrid carbon fiber spun yarn is in a range of 50 to 400 turns/m.

8. The hybrid carbon fiber spun yarn according to claim 1, wherein a density of the long carbon fibers is in a range of 1.7 to 2.3 g/cm$^3$, and a density of the short carbon fibers is in a range of 1.5 to 1.8 g/cm$^3$.

9. The hybrid carbon fiber spun yarn according to claim 1, wherein a mass per 1000 m (tex) is in a range of 30 to 150 g.

10. A hybrid carbon fiber spun yarn fabric comprising the hybrid carbon fiber spun yarn according to claim 1, in an amount of 30% by mass or more.

11. A method for manufacturing a hybrid carbon fiber spun yarn according to claim 1, said spun yarn comprising a core region which comprises carbon fibers as a main component, and a surrounding region which comprises carbon fibers as a main component and covers an outer peripheral surface of the core region, said method comprising the steps of:

mix-spinning long carbon fiber bundles which contain long carbon fibers having a fiber length of 500 mm or longer in an amount of 20% by mass or more with short carbon fiber bundles which contain short carbon fibers having a fiber length of less than 500 mm in an amount of 80% by mass or more, in such a manner that a mass ratio between the long carbon fibers and the short carbon fibers (long carbon fibers:short carbon fibers) is in a range of 20:80 to 80:20, while the short carbon fiber bundles are drafted and twisted, to obtain the hybrid carbon fiber spun yarn in which a twisted yarn forming the surrounding region formed by the short carbon fiber bundles has wound around the outer peripheral surface of the core region formed by long carbon fiber bundles.

12. A gas diffuser for a solid polymer electrolyte fuel cell comprising the hybrid carbon fiber spun yarn according to claim 1.

13. A composite reinforcement in a field of space aeronautics comprising the hybrid carbon fiber spun yarn according to claim 1.

14. A C/C composite material comprising the hybrid carbon fiber spun yarn according to claim 1.

15. A heater comprising the hybrid carbon fiber spun yarn according to claim 1.

16. A reinforcement material for a molded heat insulation material comprising the hybrid carbon fiber spun yarn according to claim 1.

17. A heat insulation comprising the hybrid carbon fiber spun yarn according to claim 1.

18. A sliding member comprising the hybrid carbon fiber spun yarn according to claim 1.

19. A conductive material comprising the hybrid carbon fiber spun yarn according to claim 1.

* * * * *